(12) United States Patent
You et al.

(10) Patent No.: US 11,616,625 B2
(45) Date of Patent: Mar. 28, 2023

(54) WIRELESS COMMUNICATION METHOD, TERMINAL, AND NETWORK DEVICE

(71) Applicant: HUAWEI TECHNOLOGIES CO., LTD., Shenzhen (CN)

(72) Inventors: Chunhua You, Shanghai (CN); Hongping Zhang, Shanghai (CN); Le Yan, Shanghai (CN); Qufang Huang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 52 days.

(21) Appl. No.: 16/986,947

(22) Filed: Aug. 6, 2020

(65) Prior Publication Data
US 2020/0366442 A1 Nov. 19, 2020

Related U.S. Application Data

(63) Continuation of application No. PCT/CN2019/073022, filed on Jan. 24, 2019.

(30) Foreign Application Priority Data

Feb. 7, 2018 (CN) .......................... 201810122785.8

(51) Int. Cl.
*H04L 5/00* (2006.01)
*H04W 72/04* (2009.01)
*H04W 72/0453* (2023.01)

(52) U.S. Cl.
CPC .......... *H04L 5/0053* (2013.01); *H04L 5/0094* (2013.01); *H04W 72/042* (2013.01); *H04W 72/0453* (2013.01)

(58) Field of Classification Search
CPC .............................. H04W 72/02; H04L 5/001
See application file for complete search history.

(56) References Cited

U.S. PATENT DOCUMENTS

| | | | | |
|---|---|---|---|---|
| 2018/0049203 | A1* | 2/2018 | Xue ...................... | H04L 5/0035 |
| 2019/0044811 | A1* | 2/2019 | Miao .................. | H04W 72/0453 |
| 2019/0053235 | A1* | 2/2019 | Novlan .................... | H04L 5/001 |
| 2021/0227568 | A1* | 7/2021 | Harada ............. | H04W 72/0453 |

FOREIGN PATENT DOCUMENTS

| | | |
|---|---|---|
| CN | 102291731 A | 12/2011 |
| CN | 103581989 A | 2/2014 |
| CN | 107396386 A | 11/2017 |

OTHER PUBLICATIONS

Nokia et al.,"On remaining aspects of NR CA/DC and BWPs",3GPP TSG-RAN WG1 Meeting NRAH#3,R1-1715755, Nagoya, Japan, Sep. 18-21, 2017, total 11 pages.

Huawei et al.,"Design considerations for UE power saving",3GPP TSG RAN WG1 Meeting #90bis ,R1-1717903, Prague, Czech Republic, Oct. 9-13, 2017, total 3 pages.

(Continued)

*Primary Examiner* — Ayaz R Sheikh
*Assistant Examiner* — Debebe A Asefa
(74) *Attorney, Agent, or Firm* — Hauptman Ham, LLP

(57) ABSTRACT

Embodiments of this application provide a wireless communication method, a terminal, and a network device. In the embodiments of this application, an operation on a wideband that includes a plurality of bandwidth parts can be supported.

14 Claims, 5 Drawing Sheets

(56) References Cited

OTHER PUBLICATIONS

RAN2,"LS on Clarifications in MAC",3GPP TSG-RAN WG1 #AH_1801,R1-1801204,Vancouver, Canada, Jan. 22-26, 2018, total 3 pages.

International Search Report issued in corresponding International Application No. PCT/CN/2019/073022, dated Apr. 26, 2019, pp. 1-12, National Intellectual Property Administration, PRC, Beijing, China.

NTT Docomo, Inc.,"Remaing issues on bandwidth parts for NR", 3GPP TSG RAN WG1 Meeting #90, R1-1713964, Prague, Czech Republic, Aug. 21-25, 2017, total 5 pages.

Interdigital, Inc.,"CORESET Monitoring Under Dynamic Change of BWP", 3GPP TSG RAN WG1 Meeting #90, R1-1714111,Prague, Czech Republic, Aug. 21-25, 2017, total 5 pages.

OPPO,"Remaining details on NR RRM measurement", 3GPP TSG RAN WG1 Meeting 91, R1-1719995, Reno, USA, Nov. 27-Dec. 1, 2017, total 4 pages.

Sony,"High Level Views on NR-U BWP", 3GPP TSG RAN WG1 Meeting 91,R1-1720475, Reno, US, Nov. 27-Dec. 2, 2017, total 4 pages.

Interdigital, Inc.,"Details of BWP switching operation", 3GPP TSG RAN WG1 Meeting AH1801, R1-1800603, Vancouver, Canada, Jan. 22-26, 2018, total 4 pages.

Huawei et al.,"Stage 3 Correction on initial active BWP index", 3GPP TSG-RAN WG2 NR Ad hoc 0118, R2-1801485, Vancouver, Canada, Jan. 22-26, 2018, total 3 pages.

European Search Report issued in corresponding European Application No. 19751597.6, dated Dec. 18, 2020, pp. 1-12, European Patent Office, Munich, Germany.

3GPP TSG RAN WG1 Meeting #91,R1-1720349,On Bandwidth Part Operation,Samsung,Reno, USA, Nov. 27 Dec. 1, 2017, total 5 pages.

Chinese Office Action issued in corresponding Chinese Application No. 201810122785.8, dated Jan. 12, 2023, pp. 1-6.

\* cited by examiner

WIRELESS COMMUNICATION METHOD, TERMINAL, AND NETWORK DEVICE

CROSS-REFERENCE TO RELATED APPLICATIONS

This application is a continuation of International Application No. PCT/CN2019/073022, filed on Jan. 24, 2019, which claims priority to Chinese Patent Application No. 201810122785.8, filed on Feb. 7, 2018. The disclosures of the aforementioned applications are hereby incorporated by reference in their entireties.

TECHNICAL FIELD

Embodiments of this application relate to communications technologies, and in particular, to a wireless communication method, a terminal, and a network device.

BACKGROUND

With popularization of mobile terminals, data traffic of a wireless communications network continuously increases, so that limited licensed spectrum resources cannot meet use requirements of users. Therefore, an unlicensed spectrum is driven to be used in the wireless communications network.

The unlicensed spectrum is a shared spectrum, and different terminals and network devices can use the shared spectrum. A terminal or a network device needs to first perform a channel access process because of regulations, and can use the shared spectrum to perform data transmission only after the channel access process is completed. The shared spectrum is widely distributed and may be divided into a plurality of channels. To be specific, the shared spectrum is divided into a plurality of channels that occupy a bandwidth within a specific range in frequency domain. A granularity in a channel access process performed by the terminal or the network device is for each channel.

However, in a long term evolution licensed assisted access (LTE LAA) technology, one cell can work on only one channel. An operation on a wideband that includes a plurality of channels is not supported in the technology.

SUMMARY

Embodiments of this application provide a wireless communication method, a terminal, and a network device, to support an operation on a wideband that includes a plurality of bandwidth parts.

According to a first aspect, an embodiment of this application provides a wireless communication method, including: receiving, by a terminal, first indication information sent by a network device, where the first indication information indicates the terminal to monitor at least one control resource set corresponding to at least one first bandwidth part BWP during running of a timer; and starting or restarting, by the terminal, the timer.

In this implementation, the control resource set corresponding to the first BWP is monitored based on the first indication information, to support an operation on a wideband that includes a plurality of bandwidth parts. In addition, the terminal does not need to monitor all control resource sets corresponding to all bandwidth part. This reduces power consumption of the terminal.

With reference to the first aspect, in a possible implementation of the first aspect, the method further includes: restarting, by the terminal, the timer after receiving downlink control information on the at least one control resource set corresponding to the at least one first BWP during running of the timer.

In this implementation, after receiving the downlink control information on the at least one control resource set corresponding to the at least one first BWP during running of the timer, the terminal may continue to monitor the at least one control resource set corresponding to the at least one first BWP.

With reference to the first aspect or the possible implementation of the first aspect, in another possible implementation of the first aspect, the method further includes: receiving, by the terminal, second indication information sent by the network device, where the second indication information indicates the terminal to monitor at least one control resource set corresponding to at least one second BWP; and starting or restarting, by the terminal, the timer after receiving downlink control information on the at least one control resource set corresponding to the at least one second BWP.

In this implementation, the terminal may monitor, based on the second indication information, the at least one control resource set corresponding to the at least one second BWP, and start or restart the timer after receiving the downlink control information on the at least one control resource set corresponding to the at least one second BWP, so that the terminal may continue to monitor the at least one control resource set corresponding to the at least one first BWP.

With reference to any one of the first aspect or the possible implementations of the first aspect, in another possible implementation of the first aspect, the receiving, by the terminal, second indication information sent by the network device includes: receiving, by the terminal, a radio resource control message sent by the network device, where the radio resource control message includes the second indication information.

With reference to any one of the first aspect or the possible implementations of the first aspect, in another possible implementation of the first aspect, the method further includes: receiving, by the terminal, third indication information sent by the network device, where the third indication information indicates the terminal to monitor at least one control resource set corresponding to at least one third BWP after the timer expires.

With reference to any one of the first aspect or the possible implementations of the first aspect, in another possible implementation of the first aspect, the method further includes: starting or restarting, by the terminal, the timer after the terminal receives downlink control information on the at least one control resource set corresponding to the at least one third BWP.

With reference to any one of the first aspect or the possible implementations of the first aspect, in another possible implementation of the first aspect, the first indication information, the second indication information, or the third indication information includes bitmap information of N bits, where N is a total quantity of BWPs configured by the network device, and one bit is used to indicate one BWP.

With reference to any one of the first aspect or the possible implementations of the first aspect, in another possible implementation of the first aspect, the first indication information and the third indication information are carried in a radio resource control message, a medium access control MAC control element, or physical layer signaling.

According to a second aspect, an embodiment of this application provides a wireless communication method. The method includes: receiving, by a terminal, measurement configuration information sent by a network device, where the measurement configuration information includes a measurement reporting periodicity and at least one measurement bandwidth; measuring, by the terminal, a received signal strength RSS of the at least one measurement bandwidth based on the at least one measurement bandwidth; and sending, by the terminal, a measurement result to the network device based on the measurement reporting periodicity.

In this implementation, the RSSI of the at least one measurement bandwidth may be reported.

With reference to the second aspect, in a possible implementation of the second aspect, the sending, by the terminal, a measurement result to the network device based on the measurement reporting periodicity includes at least one of the following: sending, by the terminal, a received signal strength indicator RSSI of each measurement bandwidth to the network device based on the measurement reporting periodicity; selecting, by the terminal, RSSIs of M measurement bandwidths from an RSSI or RSSIs of the at least one measurement bandwidth, and sending the RSSIs of the M measurement bandwidths to the network device based on the measurement reporting periodicity; and determining, by the terminal, a proportion of measurement bandwidths that meets a preset threshold condition, and sending the proportion to the network device based on the measurement reporting periodicity, where the proportion is obtained by dividing a quantity of measurement results that meet a preset measurement result value by a total quantity of measurement results, where M is any positive integer less than or equal to the total quantity of the at least one measurement bandwidth.

With reference to the second aspect or the possible implementation of the second aspect, in another possible implementation of the second aspect, the selecting, by the terminal, RSSIs of M measurement bandwidths from an RSSI or RSSIs of the at least one measurement bandwidth includes: sorting, by the terminal, the RSSIs of the at least one measurement bandwidth in descending order, and selecting RSSIs of first M measurement bandwidths; or selecting, by the terminal, RSSIs of M measurement bandwidths that are greater than an RSSI threshold from the RSSIs of the at least one measurement bandwidth.

According to a third aspect, an embodiment of this application provides a wireless communication method. The method includes: receiving, by a terminal, timing advance indication information sent by a network device; and starting, by the terminal based on the timing advance indication information, a timing advance timer corresponding to at least one bandwidth part BWP.

With reference to the third aspect, in a possible implementation of the third aspect, the starting, by the terminal based on the timing advance indication information, a timing advance timer corresponding to at least one bandwidth part BWP includes:

starting a timing advance timer of a current active BWP when the timing advance indication information does not include a BWP index; or starting, by the terminal when the timing advance indication information includes at least one BWP index, a timing advance timer of a BWP corresponding to the at least one BWP index.

With reference to the third aspect or the possible implementation of the third aspect, in another possible implementation of the third aspect, after the timing advance timer corresponding to the at least one BWP expires, the method further includes:

stopping, by the terminal, sending uplink data on an uplink shared channel of a BWP corresponding to a timing advance timer that expires;

stopping, by the terminal, sending uplink control signaling on an uplink control channel of the BWP corresponding to the timing advance timer that expires; and stopping, by the terminal, sending an SRS on the BWP corresponding to the timing advance timer that expires.

According to a fourth aspect, an embodiment of this application provides a wireless communication method, including: determining, by a network device, first indication information; and sending, by the network device, the first indication information to a terminal, where the first indication information indicates the terminal to monitor at least one control resource set corresponding to at least one first bandwidth part BWP during running of a timer.

With reference to the fourth aspect, in a possible implementation of the fourth aspect, the determining, by a network device, first indication information includes: determining, by the network device, the first indication information based on a received signal strength indicator RSSI of the at least one first bandwidth part BWP.

With reference to the fourth aspect or the possible implementation of the fourth aspect, in another possible implementation of the fourth aspect, the sending, by the network device, the first indication information to a terminal includes: sending, by the network device, a first radio resource control message, a medium access control MAC control element, or physical layer signaling to the terminal, where the first radio resource control message, the medium access control MAC control element, or the physical layer signaling includes the first indication information.

With reference to any one of the fourth aspect or the possible implementations of the fourth aspect, in another possible implementation of the fourth aspect, the method further includes: sending, by the network device, second indication information to the terminal, where the second indication information indicates the terminal to monitor at least one control resource set corresponding to at least one second BWP.

With reference to any one of the fourth aspect or the possible implementations of the fourth aspect, in another possible implementation of the fourth aspect, the method further includes: determining, by the network device, the second indication information based on the RSSI of the at least one second BWP.

With reference to any one of the fourth aspect or the possible implementations of the fourth aspect, in another possible implementation of the fourth aspect, the sending, by the network device, second indication information to the terminal includes: sending, by the network device, a second radio resource control message to the terminal, where the second radio resource control message includes the second indication information.

With reference to any one of the fourth aspect or the possible implementations of the fourth aspect, in another possible implementation of the fourth aspect, the method further includes: sending, by the network device, third indication information to the terminal, where the third indication information indicates the terminal to monitor at least one control resource set corresponding to at least one third BWP.

With reference to any one of the fourth aspect or the possible implementations of the fourth aspect, in another possible implementation of the fourth aspect, the method further includes: determining, by the network device, the third indication information based on the RSSI of the at least one third BWP.

With reference to any one of the fourth aspect or the possible implementations of the fourth aspect, in another possible implementation of the fourth aspect, the sending, by the network device, third indication information to the terminal includes: sending, by the network device, a third radio resource control message, a medium access control MAC control element, or physical layer signaling to the terminal, where the first radio resource control message, the medium access control MAC control element, or the physical layer signaling includes the third indication information.

According to a fifth aspect, an embodiment of this application provides a wireless communication method. The method includes: sending, by a network device, measurement configuration information to a terminal, where the measurement configuration information includes a measurement reporting periodicity and at least one measurement bandwidth, and the measurement configuration information is used to indicate the terminal to measure a received signal strength RSS of the at least one measurement bandwidth based on the at least one measurement bandwidth; and receiving, by the network device, a measurement result sent by the terminal.

With reference to the fifth aspect, in a possible implementation of the fifth aspect, the measurement result includes at least one of the following: a received signal strength indicator RSSI of each measurement bandwidth, RSSIs of M measurement bandwidths, and a proportion of measurement bandwidths that meets a preset threshold condition, where M is any positive integer less than or equal to a total quantity of the at least one measurement bandwidth.

According to a sixth aspect, an embodiment of this application provides a wireless communication method. The method includes: sending, by a network device, timing advance indication information to a terminal, where the timing advance indication information indicates the terminal to start a timing advance timer corresponding to at least one bandwidth part BWP.

With reference to the sixth aspect, in a possible implementation of the sixth aspect, the timing advance indication information does not include a BWP index, and the timing advance indication information indicates the terminal to start a timing advance timer of a current active BWP.

With reference to the sixth aspect or the possible implementation of the sixth aspect, in a possible implementation of the sixth aspect, the timing advance indication information includes at least one BWP index, and the timing advance indication information indicates the terminal to start a timing advance timer of a BWP corresponding to the at least one BWP index.

According to a seventh aspect, an embodiment of this application provides a terminal, where the terminal has a function of implementing a behavior of the terminal in any one of the first aspect or the possible implementations of the first aspect, any one of the second aspect or the possible implementations of the second aspect, or any one of the third aspect or the possible implementations of the third aspect. The function may be implemented by hardware, or may be implemented by hardware by executing corresponding software. The hardware or the software includes one or more modules corresponding to the foregoing function.

According to an eighth aspect, an embodiment of this application provides a network device, where the network device has a function of implementing a behavior of the network device in any one of the fourth aspect or the possible implementations of the fourth aspect, the fifth aspect or the possible implementations of the fifth aspect, or the sixth aspect or the possible implementations of the sixth aspect. The function may be implemented by hardware, or may be implemented by hardware by executing corresponding software. The hardware or the software includes one or more modules corresponding to the foregoing function.

According to a ninth aspect, an embodiment of this application provides a terminal, where the terminal includes a processor, a memory, and a transceiver. The transceiver is coupled to the processor, and the processor controls sending and receiving actions of the transceiver.

The memory is configured to store computer executable program code, where the program code includes an instruction; and when the processor executes the instruction, the instruction enables the terminal to perform the method according to any one of the first aspect to the third aspect.

According to a tenth aspect, an embodiment of this application provides a network device, where the network device includes a processor, a memory, and a transceiver. The transceiver is coupled to the processor, and the processor controls sending and receiving actions of the transceiver.

The memory is configured to store computer executable program code, where the program code includes an instruction; and when the processor executes the instruction, the instruction enables the network device to perform the method according to any one of the fourth aspect to the sixth aspect.

According to an eleventh aspect, an embodiment of this application provides a communications device, including an interface and a processor, where the interface is coupled to the processor, and the processor is configured to: perform the wireless communication method according to any one of the first aspect or the possible implementations of the first aspect, receive first indication information through the interface, and start or restart a timer.

The communications device may be a terminal device, or may be a chip. A memory and the processor may be integrated on a same chip, or may be disposed on different chips.

According to a twelfth aspect, an embodiment of this application provides a communications device, including an interface and a processor, where the interface is coupled to the processor, and the processor is configured to: perform the wireless communication method according to any one of the second aspect or the possible implementations of the second aspect, receive measurement configuration information through the interface, measure a received signal strength RSS of at least one measurement bandwidth based on the at least one measurement bandwidth, and send a measurement result based on a measurement reporting periodicity through the interface.

The communications device may be a terminal device, or may be a chip. The memory and the processor may be integrated on a same chip, or may be disposed on different chips.

According to a thirteenth aspect, an embodiment of this application provides a communications device, including an interface and a processor, where the interface is coupled to the processor, and the processor is configured to: perform the wireless communication method according to any one of the third aspect or the possible implementations of the third aspect, receive timing advance indication information through the interface, and start, based on the timing advance indication information, a timing advance timer corresponding to at least one bandwidth part BWP.

The communications device may be a terminal device, or may be a chip. The memory and the processor may be integrated on a same chip, or may be disposed on different chips.

According to a fourteenth aspect, an embodiment of this application provides a communications device, including an interface and a processor, where the interface is coupled to the processor, and the processor is configured to: perform the wireless communication method according to any one of the fourth aspect or the possible implementations of the fourth aspect, generate first indication information, and send the first indication information through the interface.

The communications device may be a network device, or may be a chip. A memory and the processor may be integrated on a same chip, or may be disposed on different chips.

According to a fifteenth aspect, an embodiment of this application provides a communications device, including an interface and a processor, where the interface is coupled to the processor, and the processor is configured to: perform the wireless communication method according to any one of the fifth aspect or the possible implementations of the fifth aspect, generate measurement configuration information, and send the measurement configuration information through the interface.

The communications device may be a network device, or may be a chip. A memory and the processor may be integrated on a same chip, or may be disposed on different chips.

According to a sixteenth aspect, an embodiment of this application provides a communications device, including an interface and a processor, where the interface is coupled to the processor, and the processor is configured to: perform the wireless communication method according to any one of the sixth aspect or the possible implementations of the sixth aspect, generate timing advance indication information, and send the timing advance indication information through the interface.

The communications device may be a network device, or may be a chip. A memory and the processor may be integrated on a same chip, or may be disposed on different chips.

According to a seventeenth aspect, an embodiment of this application provides a computer-readable storage medium, where the computer-readable storage medium stores a computer program, the computer program includes at least one segment of code, and the at least one segment of code may be executed by a computer, to control the computer to perform the operations according to any one of the first aspect to the sixth aspect.

According to an eighteenth aspect, an embodiment of this application provides a computer program. When being executed by a computer, the computer program is configured to perform the operations according to any one of the first aspect to the sixth aspect.

The program may be completely or partially stored in a storage medium that is encapsulated together with the processor, or may be partially or completely stored in a memory that is not encapsulated together with the processor.

According to a nineteenth aspect, an embodiment of this application provides a communications device, including a memory and a processor, where the memory is coupled to the processor, and the processor is configured to perform the operations according to any one of the first aspect to the sixth aspect.

According to a twentieth aspect, an embodiment of this application provides a processor, where the processor includes at least one circuit, configured to perform the method according to any one of the first aspect to the sixth aspect.

The processor may be a chip.

In the embodiments of this application, the wireless communication method, the terminal, and the network device are provided. The network device sends the first indication information to the terminal, where the first indication information indicates the terminal to monitor the at least one control resource set corresponding to the at least one BWP during running of the timer; and the terminal starts or restarts the timer, and the terminal monitors the control resource set corresponding to the at least one first BWP during running of the timer. In this way, the terminal monitors, based on the first indication information, the control resource set corresponding to the first BWP, to support an operation on a wideband that includes a plurality of bandwidth parts. In addition, the terminal does not need to monitor all control resource sets corresponding to all bandwidth part. This reduces power consumption of the terminal.

BRIEF DESCRIPTION OF DRAWINGS

The following briefly describes the accompanying drawings for describing the embodiments.

DESCRIPTION OF EMBODIMENTS

The following clearly describes the technical solutions in the embodiments of this application with reference to the accompanying drawings in the embodiments of this application.

Figure 1:
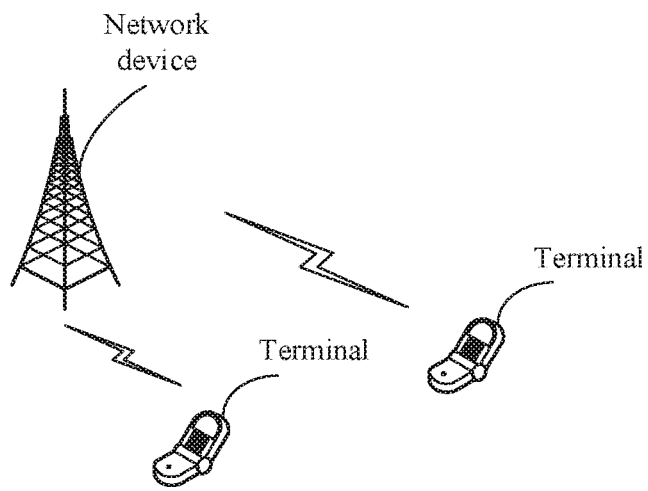
FIG. 1 is a frame diagram of a communications system according to this application.

FIG. 1 is a frame diagram of a communications system according to this application. A wireless communication method provided in this application is applicable to the communications system shown in FIG. 1. The communications system may be an LTE communications system, or may be another future communications system (for example, a 5G communications system). This is not limited herein. As shown in FIG. 1, the communications system includes a network device and a terminal.

The network device may be a base station, or an access point, or may be a device in communication with a wireless terminal via one or more sectors at an air interface in an access network. The base station may be configured to mutually convert a received over-the-air frame and a received IP packet and serve as a router between the wireless terminal and a rest portion of the access network, where the rest portion of the access network may include an internet protocol (IP) network. The base station may coordinate attribute management of the air interface. For example, the base station may be a base transceiver station (BTS) in a global system for mobile communications (GSM) or code division multiple access (CDMA), or may be a NodeB (NB) in wideband code division multiple access (WCDMA), or may be an evolved NodeB (eNB or eNodeB) in long term evolution (LTE), a relay node or an access point, a gNodeB (gNB) in a 5G network, or the like. This is not limited herein.

The terminal may be a wireless terminal or a wired terminal. The wireless terminal may refer to a device that provides a user with voice and/or other service data connectivity, a handheld device having a wireless connection function, or another processing device connected to a radio modem. The wireless terminal may communicate with one or more core networks through a radio access network (RAN). The wireless terminal may be a mobile terminal, such as a mobile phone (which also referred to as a "cellular" phone) or a computer having a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (PCS) phone, a cordless telephone set, a session initiation protocol (SIP) phone, a wireless local loop (WLL) station, or a personal digital assistant (Personal Digital Assistant, PDA). The wireless terminal may also be referred to as a system, a subscriber unit, a subscriber station, a mobile station, a remote station, a remote terminal, an access terminal, a user terminal, a user agent, a user device (User Device or User Equipment). This is not limited herein.

A "bandwidth part (BWP)" in this application is specifically a resource that occupies a bandwidth within a specific range in frequency domain. For example, one BWP includes some or all resources of at least one channel. For example, a BWP 1 may include a channel 1 and a channel 2, or may include some resources of the channel 1 and some resources of the channel 2. A range of the BWP may be configured for the terminal by the network device based on a requirement. For example, the range of the BWP is from 10 MHz to 20 MHz. In some embodiments, the network device may further configure a subcarrier spacing, a cyclic prefix length, and the like of the BWP for the terminal. To be specific, different BWPs may use different subcarrier spacings and different cyclic prefix lengths, and the terminal may exchange information with the network device by using the BWP.

It should be noted that the BWP is only a name, and the name does not constitute a limitation on a resource. In a 5G network and another future network, the BWP may alternatively be another name. This is not specifically limited in the embodiments of this application. For example, the BWP may alternatively be replaced with a BW or the like. This is centrally described herein, and details are not described below again.

In this application, BWPs are classified into three types of BWPs: a first BWP, a second BWP, and a third BWP respectively. The first BWP, the second BWP, and the third BWP are used to distinguish between BWPs that different pieces of indication information are used to indicate to monitor. Each BWP corresponds to one or more control resource sets (CORESET). The control resource set (CORESET) is a resource used to send downlink control information, and includes at least one of the following: a time domain resource or a frequency domain resource. For example, the control resource set (CORESET) may belong to one or more physical downlink control channels (PDCCH). The control resource set may be configured by the network device.

It should be understood that although terms "first", "second", "third" and the like may be used in the embodiments of this application to describe various information, the information is not limited by the terms. These terms are merely used to distinguish between the information. For example, without departing from the scope of the embodiments of this application, the first BWP may also be referred to as a second BWP. Similarly, the second BWP may also be referred to as a first BWP. The first indication information may also be referred to as second indication information. Similarly, the second indication information may also be referred to as first indication information.

Figure 2:
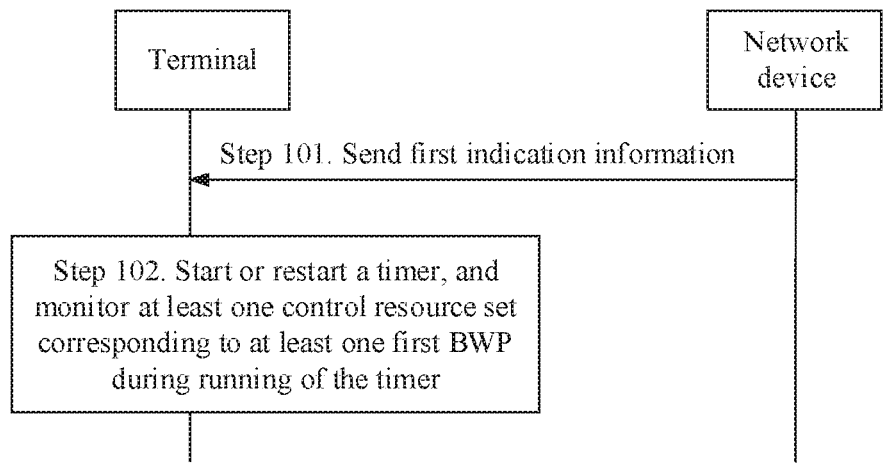
FIG. 2 is a flowchart of a wireless communication method according to this application.

FIG. 2 is a flowchart of a wireless communication method according to this application. As shown in FIG. 2, the method in this embodiment may include the following steps.

Step 101. A network device sends first indication information to a terminal.

Correspondingly, the terminal receives the first indication information sent by the network device. The first indication information indicates the terminal to monitor (monitor) at least one control resource set corresponding to at least one first bandwidth part BWP during running of a timer. The control resource set may include one or more control resource sets. The control resource set (CORESET) is a resource used to send downlink control information, and includes at least one of the following: a time domain resource or a frequency domain resource. It should be noted that in this embodiment of this application, monitoring may alternatively be replaced with detecting, checking, or the like. This is not limited in this embodiment of this application.

Specifically, the first indication information may indicate the terminal to monitor at least one control resource set corresponding to one or more BWPs during running of the timer. The first indication information may be carried in a radio resource control (RRC) message, a medium access control (MAC) control element (CE), or physical layer signaling. That the one or more BWPs correspond to the at least one control resource set includes at least one of the following cases: one BWP corresponds to one control resource set (CORESET), one BWP corresponds to a plurality of control resource sets (CORESET), a plurality of BWPs correspond to one control resource set (CORESET), and a plurality of BWPs correspond to a plurality of control resource sets (CORESET). For example, one BWP corresponds to three control resource sets (CORESET). The terminal device monitors the three control resource sets (CORESET) during running of the timer.

Step 102. The terminal starts or restarts the timer; the terminal monitors the at least one control resource set corresponding to the at least one first BWP during running of the timer.

Duration of the timer may be configured by the network device.

That the terminal monitors the at least one control resource set corresponding to the at least one first BWP specifically means that the terminal monitors downlink control information sent on the at least one control resource set (CORESET) corresponding to the at least one first BWP.

The downlink control information may be downlink assignment information or uplink grant information. The downlink assignment information is used to assign a downlink resource, for example, a physical downlink shared channel (PDSCH) resource, and the uplink grant information is used to assign an uplink resource, for example, a physical uplink shared channel (PUSCH) resource.

In some embodiments, the terminal restarts the timer after receiving the downlink control information on the at least one control resource set corresponding to the at least one first BWP during running of the timer. To be specific, when the terminal receives the downlink control information during running of the timer, the terminal may determine that the network device needs to transmit data. Therefore, the terminal restarts the timer, to continue to monitor the at least one control resource set corresponding to the at least one first BWP.

In some embodiments, the first indication information includes bitmap information of N bits, where N is a total quantity of BWPs configured by the network device, and one bit is used to indicate one BWP. For example, a value of one bit is 0 or 1. "1" may be used to indicate to monitor the BWP corresponding to the bit, and "0" may be used to indicate not to monitor the BWP corresponding to the bit. For further example, if the total quantity of BWPs configured by the network device for the terminal is 3, the first indication information may be 100, and the three bits respectively correspond to a BWP 1, a BWP 2, and a BWP 3. The terminal determines, based on the first indication information, to monitor a control resource set corresponding to the BWP 1 during running of the timer. There may be one or more control resource sets.

In some embodiments, the first indication information includes bitmap information of L bits, where L is a total quantity of control resource sets (CORESET) configured by the network device, and one bit is used to indicate one control resource set (CORESET). For example, a value of one bit is 0 or 1. "1" may be used to indicate to monitor a control resource set (CORESET) corresponding to the bit, and "0" may be used to indicate not to monitor a control resource set (CORESET) corresponding to the bit. For further example, if the total quantity of control resource sets (CORESET) configured by the network device for the terminal is 3, the first indication information may be 100, and the three bits respectively correspond to a CORESET 1, a CORESET 2, and a CORESET 3. The terminal determines, based on the first indication information, to monitor the CORESET 1 during running of the timer. The CORESET 1 may be understood as a control resource set corresponding to the first BWP.

In this embodiment, the network device sends the first indication information to the terminal, where the first indication information indicates the terminal to monitor the at least one control resource set corresponding to the at least one BWP during running of the timer; and the terminal starts or restarts the timer, and the terminal monitors the at least one control resource set corresponding to the at least one first BWP during running of the timer. In this way, the terminal monitors, based on the first indication information, the control resource set corresponding to the first BWP, to support an operation on a wideband that includes a plurality of bandwidth parts. In addition, the terminal does not need to monitor all control resource sets corresponding to all bandwidth parts. This reduces power consumption of the terminal.

The following describes in detail the technical solution of the method embodiment shown in FIG. 2 by using a detailed embodiment.

Figure 3:
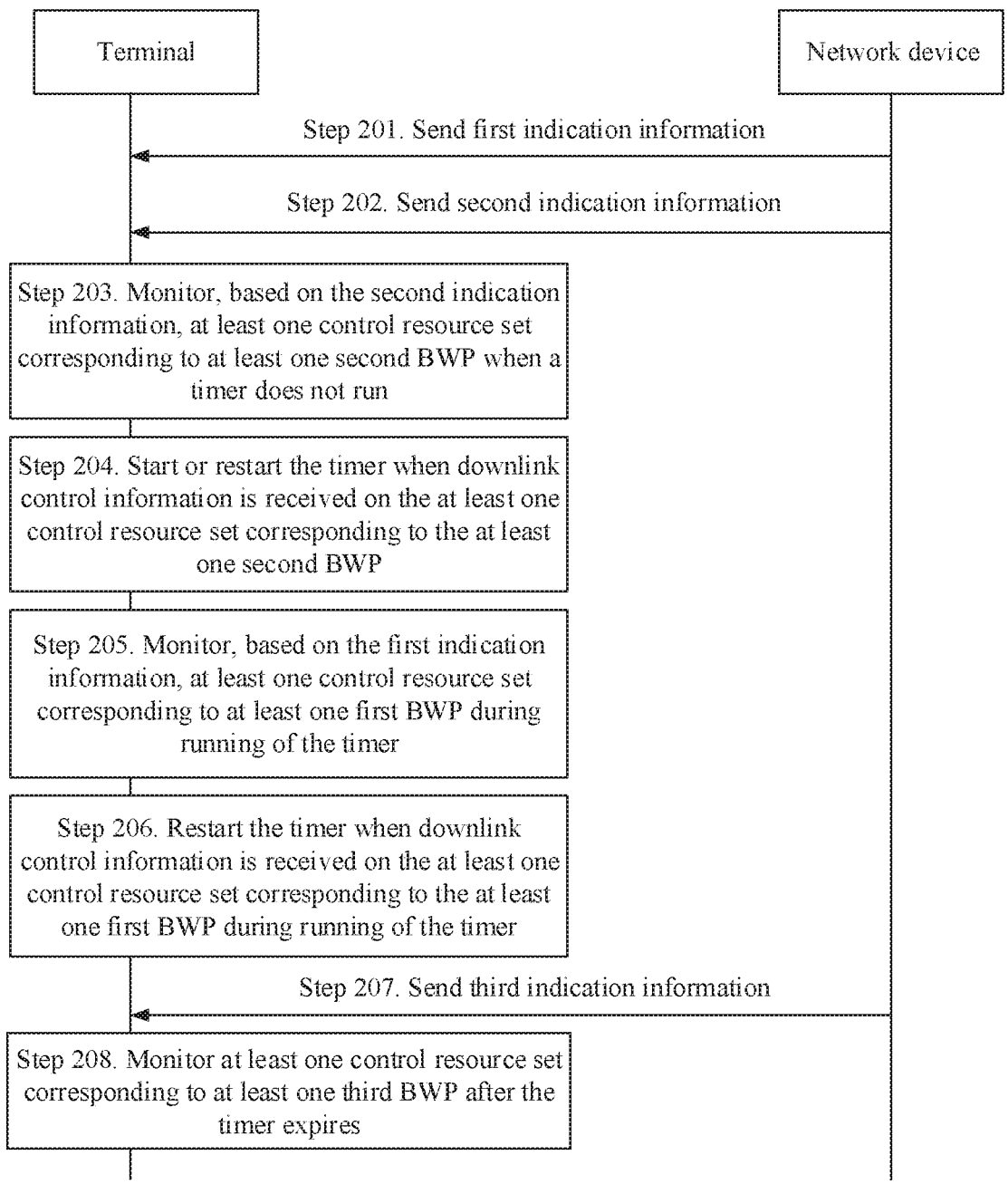
FIG. 3 is a flowchart of another wireless communication method according to this application.

FIG. 3 is a flowchart of another wireless communication method according to this application. As shown in FIG. 3, the method in this embodiment may include the following steps.

Step 201. A network device sends first indication information to a terminal.

Correspondingly, the terminal receives the first indication information sent by the network device. The first indication information indicates the terminal to monitor at least one control resource set corresponding to at least one first bandwidth part BWP during running of a timer.

For specific explanations and descriptions of step 201, refer to step 101 in the embodiment shown in FIG. 2. Details are not described herein again.

Step 202. The network device sends second indication information to the terminal.

Correspondingly, the terminal receives the second indication information sent by the network device, where the second indication information indicates the terminal to monitor at least one control resource set corresponding to at least one second BWP.

Specifically, a difference between the second indication information and the first indication information lies in that the second indication information indicates the terminal to monitor a control resource set corresponding to the at least one second BWP.

In some embodiments, the second indication information indicates the terminal to monitor the control resource set corresponding to the at least one second BWP when the timer does not run. Whether the terminal monitors or monitors the at least one control resource set corresponding to the at least one second BWP during running of the timer may be flexibly set as required. For example, during running of the timer, the terminal may stop monitoring or monitoring the at least one control resource set corresponding to the at least one second BWP, or may continue to monitor or monitor the at least one control resource set corresponding to the at least one second BWP. This is not limited herein. The terminal starts or restarts the timer when receiving downlink control information on the at least one control resource set corresponding to the at least one second BWP. That the one or more second BWPs correspond to the at least one control resource set includes at least one of the following: one second BWP corresponds to one control resource set (CORESET), one second BWP corresponds to a plurality of control resource sets (CORESET), a plurality of second BWPs correspond to one control resource set (CORESET), and a plurality of second BWPs correspond to a plurality of control resource sets (CORESET). For example, one second BWP corresponds to three control resource sets, and the terminal device may monitor or monitor the three control resource sets based on the second indication information.

Optionally, the second indication information may be used for indication when a secondary cell (SCell) or a primary secondary cell (PSCell) is added, and is used to indicate the terminal to monitor an initial control resource set, for example, a control resource set of the at least one second BWP.

In an implementable manner, the network device sends a radio resource control message to the terminal, and the terminal receives the radio resource control message sent by the network device, where the radio resource control message includes the second indication information.

Step 203. The terminal monitors, based on the second indication information, the control resource set corresponding to the at least one second BWP.

Specifically, the terminal monitors, based on the second indication information, the at least one control resource set corresponding to the at least one second BWP, to monitor whether there is downlink control information. For example, the terminal may determine, based on the second indication information, the at least one control resource set that corresponds to the at least one second BWP and that needs to be monitored. After receiving the downlink control information on the at least one control resource set corresponding to the at least one second BWP, the terminal performs the following step 204. If not receiving the downlink control information, the terminal may continue to monitor the at least one control resource set corresponding to the at least one second BWP.

Step 204: The terminal starts or restarts the timer after receiving the downlink control information on the at least one control resource set corresponding to the at least one second BWP.

Specifically, after the terminal receives the downlink control information on the at least one control resource set corresponding to the at least one second BWP, the terminal starts or restarts the timer if the network device has a scheduling requirement or in another case.

Step 205. The terminal monitors, based on the first indication information, the at least one control resource set corresponding to the at least one first BWP during running of the timer.

During running of the timer, the terminal monitors the at least one control resource set corresponding to the at least one first BWP, to monitor whether there is downlink control information. The terminal performs the following step 206 after receiving the downlink control information on the at least one control resource set corresponding to the at least one first BWP during running of the timer; the terminal performs step 208 if not receiving the downlink control information on the at least one control resource set corresponding to the at least one first BWP during running of the timer.

Step 206. The terminal restarts the timer after receiving downlink control information on the at least one control resource set corresponding to the at least one first BWP during running of the timer.

Step 207. The network device sends third indication information to the terminal.

Correspondingly, the terminal receives the third indication information sent by the network device, where the third indication information indicates the terminal to monitor at least one control resource set corresponding to at least one third BWP after the timer expires.

That the one or more third BWPs correspond to the at least one control resource set includes at least one of the following cases: one third BWP corresponds to one control resource set (CORESET), one third BWP corresponds to a plurality of control resource sets (CORESET), a plurality of third BWPs correspond to one control resource set (CORESET), and a plurality of third BWPs correspond to a plurality of control resource sets (CORESET). For example, one third BWP corresponds to three control resource sets, and the terminal device monitors or monitors the three control resource sets after the timer expires.

The third indication information is carried in a radio resource control message, a MAC CE, or physical layer signaling.

An execution sequence of step 207 is not limited by a sequence number. For example, step 207 may be performed before step 203.

It should be noted that an execution sequence of step 201, step 202, and step 207 is not limited by a sequence number. It may be understood that the first indication information, the second indication information, and the third indication information may be sent in one message, or may be separately sent in a plurality of messages. This may be flexibly set as required.

It should be further noted that the at least one third BWP and the at least one second BWP may be a same BWP, and the at least one third BWP may be some BWPs in the at least one first BWP. This may be flexibly set as required.

If the terminal does not receive the downlink control information during running of the timer, it indicates that the network device has no scheduling requirement. In this case, the terminal may monitor, based on the third indication information, a control resource set corresponding to BWPs whose quantity is less than that of the at least one first BWP, thereby reducing power consumption of the terminal.

Step 208. The terminal monitors the at least one control resource set corresponding to the at least one third BWP after the timer expires.

Specifically, the terminal monitors the at least one control resource set corresponding to the at least one third BWP after the timer expires, to monitor whether there is downlink control information.

In some embodiments, the terminal starts or restarts the timer after the terminal receives the downlink control information on the at least one control resource set corresponding to the at least one third BWP.

It should be noted that in an implementable manner, the second indication information and the third indication information each may also include bitmap information of N bits, where N is a total quantity of BWPs configured by the network device, and one bit is used to indicate one BWP. In another implementable manner, any two or three of the first indication information, the second indication information, and the third indication information include bitmap information of N bits in total, where N is a total quantity of BWPs configured by the network device, and one bit is used to indicate one BWP. This may be flexibly configured as required.

It should be noted that, in an implementable manner, the second indication information and the third indication information may each also include bitmap information of L bits, where L is a total quantity of control resource sets (CORESET) configured by the network device, and one bit is used to indicate one control resource set (CORESET). In another implementable manner, any two or three of the first indication information, the second indication information, and the third indication information include bitmap information of L bits in total, where L is a total quantity of resource control sets (CORESET) configured by the network device, and one bit is used to indicate one control resource set (CORESET). This may be flexibly configured as required.

It should be further noted that when the network device needs to update the control resource set that corresponds to the BWP and that is monitored by the terminal or needs to update the BWP monitored by the terminal, the network device may send the first indication information and the third indication information by using a MAC CE or physical layer signaling. For example, in the foregoing embodiment, the first indication information indicates the terminal to monitor the control resource set corresponding to the BWP 1, and when needing to indicate the terminal to monitor control resource sets corresponding to the BWP 1 and the BWP 2 during running of the timer, the network device may send updated first indication information by using a MAC CE or physical layer signaling.

In this embodiment, the network device sends first indication information to the terminal, where the first indication information indicates the terminal to monitor the at least one control resource set corresponding to the at least one BWP during running of the timer. The terminal starts or restarts the timer, the terminal monitors the at least one control resource set corresponding to the at least one first BWP during running of the timer, and the terminal monitors, based on the third indication information, the at least one control resource set corresponding to the at least one third BWP after the timer expires. In this way, the terminal monitors the at least one control resource set corresponding to the BWPs of the terminal based on the first indication information, the second indication information, and the third indication information, to support an operation on a wideband that includes a plurality of bandwidth parts. In addition, the terminal does not need to monitor some or all control resource sets corresponding to all bandwidth parts, thereby reducing power consumption of the terminal.

Figure 4:
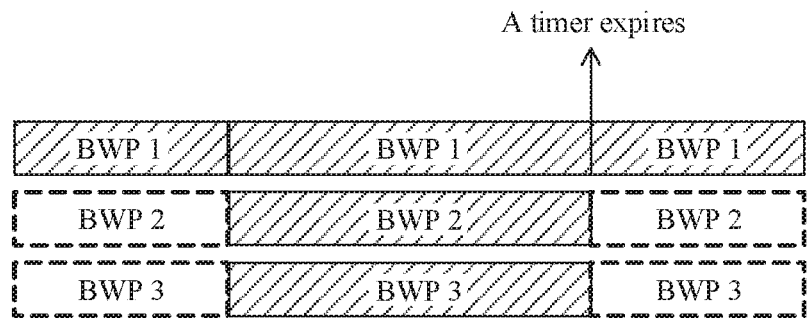
FIG. 4 is a schematic diagram of monitoring a control resource set corresponding to a BWP according to this application.

FIG. 4 is a schematic diagram of monitoring a control resource set corresponding to a BWP according to this application. As shown in FIG. 4, in this embodiment, three BWPs are used as an example to describe the embodiment shown in FIG. 3. The network device may configure, for the terminal, the three BWPs shown in FIG. 4, which are a BWP 1, a BWP 2, and a BWP 3 respectively. Specifically, the network device may configure, for the terminal, a bandwidth and a start subcarrier or a center frequency that correspond to each of the BWP 1, the BWP 2, and the BWP 3. A horizontal direction is a time axis and a vertical direction is a frequency axis in FIG. 4. Shadows in FIG. 4 indicate that the terminal monitors a control resource set corresponding to a BWP, and blanks in FIG. 4 indicate that the terminal does not monitor a control resource set corresponding to a BWP. The network device sends first indication information, second indication information, and third indication information to the terminal, where the first indication information indicates the terminal to monitor control resource sets corresponding to a BWP 1, a BWP 2, and a BWP 3 during running of a timer, the second indication information indicates the terminal to monitor the control resource set corresponding to the BWP 1, and the third indication information indicates the terminal to monitor the control resource set corresponding to the BWP 1 after the timer expires. As shown in FIG. 4, in an initial monitoring state, the terminal monitors, based on the second indication information, the control resource set corresponding to the BWP 1. The terminal starts the timer after receiving downlink control information on the control resource set corresponding to the BWP 1. The terminal monitors, based on the first indication information, the control resource sets corresponding to the BWP 1, the BWP 2, and the BWP 3 during running of the timer. The terminal restarts the timer after receiving the downlink control information on a control resource set corresponding to any of the BWP 1, the BWP 2, and the BWP 3. The terminal monitors, based on the third indication information, the control resource set corresponding to the BWP 1 after the timer expires.

In this embodiment, the terminal does not need to monitor the control resource sets corresponding to all the bandwidth parts, thereby reducing power consumption of the terminal.

Figure 5:
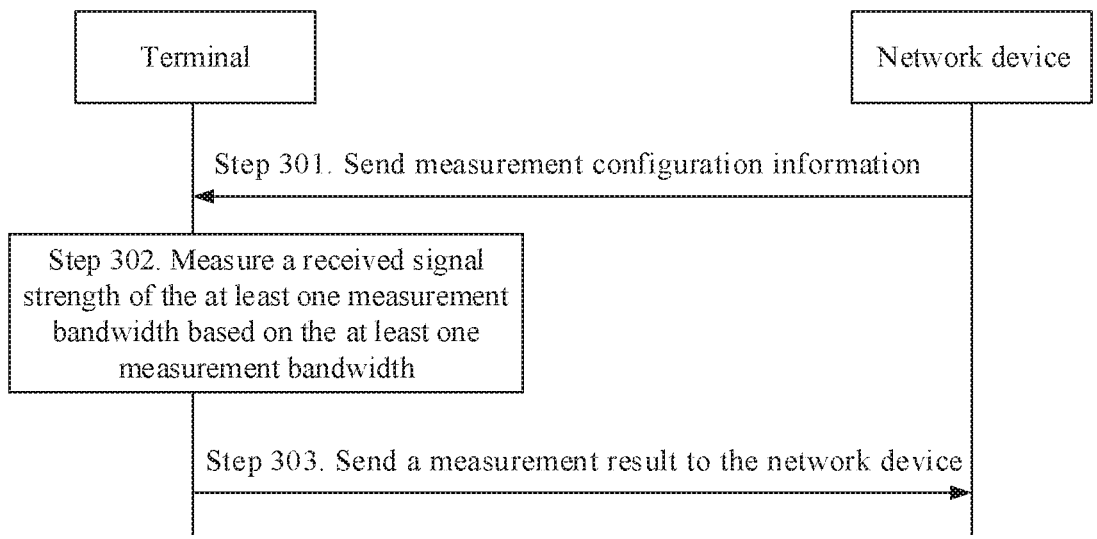
FIG. 5 is a flowchart of another wireless communication method according to this application.

FIG. 5 is a flowchart of another wireless communication method according to this application. As shown in FIG. 5, the method in this embodiment may include the following steps.

Step 301. A network device sends measurement configuration information to a terminal.

Correspondingly, the terminal receives the measurement configuration information sent by the network device, where the measurement configuration information includes a measurement reporting periodicity and at least one measurement bandwidth.

The at least one measurement bandwidth may be a continuous bandwidth, or may be a discontinuous bandwidth. For example, the at least one measurement bandwidth may include the BWP 1 and the BWP 2 shown in FIG. 4. In some embodiments, the at least one measurement bandwidth may belong to a same cell or carrier.

Step 302. The terminal measures a received signal strength (RSS) of the at least one measurement bandwidth based on the at least one measurement bandwidth.

The terminal may measure an RSS of a corresponding measurement bandwidth based on the at least one measurement bandwidth.

Step 303. The terminal sends a measurement result to the network device based on the measurement reporting periodicity.

Correspondingly, the network device receives the measurement result sent by the terminal. The measurement result includes at least one of the following: a received signal strength indicator RSSI of each measurement bandwidth, RSSIs of M measurement bandwidths, and a proportion that meets a preset threshold condition, where M is any positive integer less than or equal to a total quantity of the at least one measurement bandwidth.

In some embodiments, step 303 specifically includes at least one of the following: sending, by the terminal, a received signal strength indicator (RSSI) of each measurement bandwidth to the network device based on the measurement reporting periodicity, where the RSSI may be an average value of received signal strengths of each measurement bandwidth, for example, may be an average value of received signal strengths measured 10 times; selecting, by the terminal, RSSIs of M measurement bandwidths from an RSSI or RSSIs of the at least one measurement bandwidth, and sending the RSSI or the RSSIs of the M measurement bandwidths to the network device based on the measurement reporting periodicity; and determining, by the terminal, a proportion that meets a preset threshold condition, and sending the proportion to the network device based on the measurement reporting periodicity, where the proportion that meets the preset threshold may be a proportion greater than a preset threshold, the proportion may be calculated by dividing a quantity of measurement results of which measurement result values are greater than a preset measurement result value by a total quantity of measurement results, and M is any positive integer less than or equal to a total quantity of the at least one measurement bandwidth.

Both the preset threshold and the preset measurement result value may be flexibly set as required.

It should be noted that, that the terminal selects the RSSIs of the M measurement bandwidths from the RSSI or the RSSIs of the at least one measurement bandwidth may be implemented in the following manners. In one implementable manner, the terminal sorts the RSSIs of the at least one measurement bandwidth in descending order, and selects RSSIs of first M measurement bandwidths. In another implementable manner, the terminal selects RSSIs of M measurement bandwidths that are greater than an RSSI threshold from the RSSI or the RSSIs of the at least one measurement bandwidth.

In some embodiments, the network device may determine, based on a measurement result reported by the terminal, whether a hidden terminal exists in a corresponding measurement bandwidth, and determine impact of the hidden terminal on data transmission, to perform a BWP activation or deactivation operation. The network device may further determine, based on the measurement result, BWPs that are indicated to be monitored in the first indication information and the third indication information in the foregoing embodiment.

In this embodiment, the network device sends the measurement configuration information to the terminal, where the measurement configuration information includes the measurement reporting periodicity and the at least one measurement bandwidth. The terminal measures the received signal strength of the at least one measurement bandwidth based on the at least one measurement bandwidth, and the terminal sends the measurement result to the network device based on the measurement reporting periodicity. In this way, the RSSI of the at least one measurement bandwidth is reported.

Figure 6:
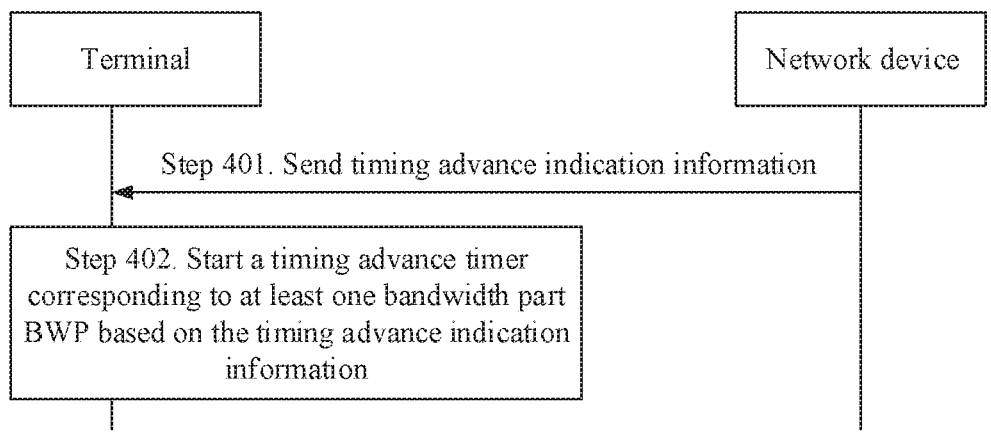
FIG. 6 is a flowchart of another wireless communication method according to this application.

FIG. 6 is a flowchart of another wireless communication method according to this application. As shown in FIG. 6, the method in this embodiment may include the following steps.

Step 401. A network device sends timing advance indication information to a terminal.

Correspondingly, the terminal receives the timing advance indication information sent by the network device. The timing advance indication information indicates the terminal to start a timing advance timer (TAT) corresponding to at least one bandwidth part BWP.

The at least one BWP may be a BWP configured by the network device for the terminal, and the at least one BWP may belong to a same cell or different cells. The timing advance indication information indicates the terminal to start a TAT corresponding to one or more BWPs. The TAT is used by the terminal to determine whether a timing advance pre-indicated by the network device is valid. When the TAT expires, the timing advance is invalid. Timing advances in a same cell or cells in a cell group are the same.

In an implementable manner, the timing advance indication information does not include a BWP index, and the timing advance indication information indicates the terminal to start a timing advance timer of a current active BWP.

In another implementable manner, the timing advance indication information includes at least one BWP index, and the timing advance indication information indicates the terminal to start a timing advance timer of a BWP corresponding to the at least one BWP index.

Step 402. The terminal starts, based on the timing advance indication information, the timing advance timer corresponding to the at least one bandwidth part BWP.

When the timing advance indication information does not include the BWP index, the terminal starts the timing advance timer of the current active BWP. The current active BWP may be a BWP activated by the network device using downlink control information. After starting the timing advance timer of the current active BWP, the terminal device may perform at least one of the following operations in a TA validity period: sending a preamble sequence on a random access channel of the active BWP, sending uplink data on an uplink shared channel of the active BWP, sending uplink control signaling on an uplink control channel of the active BWP, monitoring a downlink control channel, and receiving downlink data sent on a downlink shared channel.

When the timing advance indication information includes the at least one BWP index, the terminal starts the timing advance timer of the BWP corresponding to the at least one BWP index. After starting the timing advance timer of the BWP corresponding to the at least one BWP index, the terminal device may perform at least one of the following operations in a TA validity period of the BWP corresponding to the BWP index: sending a preamble sequence on a random access channel of the BWP, and sending uplink data on an uplink shared channel of the BWP, sending uplink control signaling on an uplink control channel of the BWP, monitoring a downlink control channel, and receiving downlink data sent on a downlink shared channel.

In some embodiments, after the timing advance timer corresponding to the at least one BWP expires, at least one of the following operations may be further performed: stopping, by the terminal, sending uplink data on an uplink shared channel of a BWP corresponding to a timing advance timer that expires; stopping, by the terminal, sending uplink control signaling on an uplink control channel of the BWP corresponding to the timing advance timer that expires; and stopping, by the terminal, sending a sounding reference signal (SRS) on the BWP corresponding to the timing advance timer that expires.

In this embodiment, the network device sends the timing advance indication information to the terminal, and the terminal starts, based on the timing advance indication information, the timing advance timer corresponding to the at least one bandwidth part BWP, to support an operation on a wideband that includes a plurality of bandwidth parts.

It may be understood that in the foregoing embodiments, the methods or steps implemented by the terminal may alternatively be implemented by a chip inside the terminal. The method or steps implemented by the network device may alternatively be implemented by a chip inside the network device.

Figure 7:
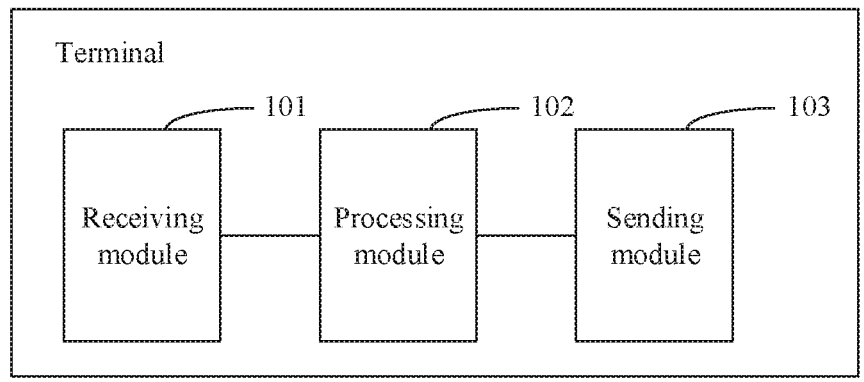
FIG. 7 is a schematic structural diagram of a terminal according to this application.

FIG. 7 is a schematic structural diagram of a terminal according to this application. As shown in FIG. 7, the terminal in this embodiment may include a receiving module 101 and a processing module 102. The receiving module 101 is configured to receive first indication information sent by a network device, where the first indication information indicates the terminal to monitor at least one control resource set corresponding to at least one first bandwidth BWP during running of a timer. The processing module 102 is configured to start or restart the timer.

In some embodiments, the processing module 102 is further configured to restart the timer after downlink control information is received on the at least one control resource set corresponding to the at least one first BWP during running of the timer.

In some embodiments, the receiving module 101 is further configured to receive second indication information sent by the network device, where the second indication information indicates the terminal to monitor at least one control resource set corresponding to at least one second BWP; the processing module 102 is further configured to start or restart the timer after the terminal receives downlink control information on the at least one control resource set corresponding to the at least one second BWP.

In some embodiments, that the receiving module 101 is configured to receive a radio resource control message sent by the network device, where the radio resource control message includes the second indication information.

In some embodiments, the receiving module 101 is further configured to receive third indication information sent by the network device, where the third indication information indicates the terminal to monitor at least one control resource set corresponding to at least one third BWP after the timer expires.

In some embodiments, the processing module 102 is further configured to: start or restart the timer if the downlink control information is received on the at least one control resource set corresponding to the at least one third BWP.

In some embodiments, the first indication information, the second indication information, or the third indication information includes bitmap information of N bits, where N is a total quantity of BWPs configured by the network device, and one bit is used to indicate one BWP.

In some embodiments, the first indication information and the third indication information are carried in a radio resource control message, a medium access control MAC control element, or physical layer signaling.

In some embodiments, the terminal may further include a sending module 103, configured to send information or data.

The terminal described in this embodiment may be configured to perform technical solutions performed by the terminal or the chip of the terminal in the foregoing method embodiments in FIG. 2 and FIG. 3. Implementation principles and technical effects are similar thereof. For functions of the modules of the terminal, refer to corresponding descriptions in the method embodiments, and details are not described herein again.

This application further provides another terminal. The terminal may use a same structure as that of the terminal shown in FIG. 7. A receiving module is configured to receive measurement configuration information sent by a network device, where the measurement configuration information includes a measurement reporting periodicity and at least one measurement bandwidth. A processing module is configured to measure a received signal strength RSS of the at least one measured bandwidth based on the at least one measured bandwidth. The processing module is further configured to send a measurement result to the network device based on the measurement reporting periodicity by using a sending module.

In some embodiments, that the processing module is further configured to send a received signal strength indicator RSSI of each measurement bandwidth to the network device based on the measurement reporting periodicity by using the sending module; selecting, by the processing module, RSSIs of M measurement bandwidths from an RSSI or RSSIs of at least one measurement bandwidth, and sending the RSSIs of the M measurement bandwidths to the network device based on the measurement reporting periodicity by using the sending module; and determining, by the processing module, a proportion of measurement bandwidths that meets a preset threshold condition, and sending the proportion to the network device by using the sending module based on the measurement reporting periodicity, where the proportion is obtained by dividing a quantity of measurement results that meet a preset measurement result value by a total quantity of measurement results, where M is any positive integer less than or equal to the total quantity of the at least one measurement bandwidth.

In some embodiments, that the processing module is configured to: sort the RSSIs of the at least one measurement bandwidth in descending order, and selecting the RSSIs of the first M measurement bandwidths; or select RSSIs of first M measurement bandwidths that are greater than an RSSI threshold from the RSSI or RSSIs of the at least one measurement bandwidth.

The terminal described in this embodiment may be configured to perform technical solutions performed by the terminal or the chip of the terminal in the foregoing method embodiment in FIG. 5. Implementation principles and technical effects are similar thereof. For functions of the modules of the terminal, refer to corresponding descriptions in the method embodiment, and details are not described herein again.

This application further provides another terminal. The terminal may use a structure the same as that of the terminal shown in FIG. 7. A receiving module is configured to receive timing advance indication information sent by a network device. A processing module is configured to start, based on the timing advance indication information, a timing advance timer corresponding to at least one bandwidth part BWP.

In some embodiments, that the processing module is configured to: when the timing advance indication information does not include a BWP index, start a timing advance timer of a current active BWP; or when the timing advance indication information includes at least one BWP index, start a timing advance timer of a BWP corresponding to the at least one BWP index.

In some embodiments, after the timing advance timer corresponding to the at least one BWP expires, the processing module is further configured to perform at least one of the following: stopping sending uplink data on an uplink shared channel of a BWP corresponding to a timing advance timer that expires; stopping sending uplink control signaling on an uplink control channel of the BWP corresponding to the timing advance timer that expires; and stopping sending an SRS on the BWP corresponding to the timing advance timer that expires.

The terminal described in this embodiment may be configured to perform technical solutions performed by the terminal or the chip of the terminal in the foregoing method embodiment in FIG. 6. Implementation principles and technical effects are similar thereof. For functions of the modules of the terminal, refer to corresponding descriptions in the method embodiment, and details are not described herein again.

Figure 8:
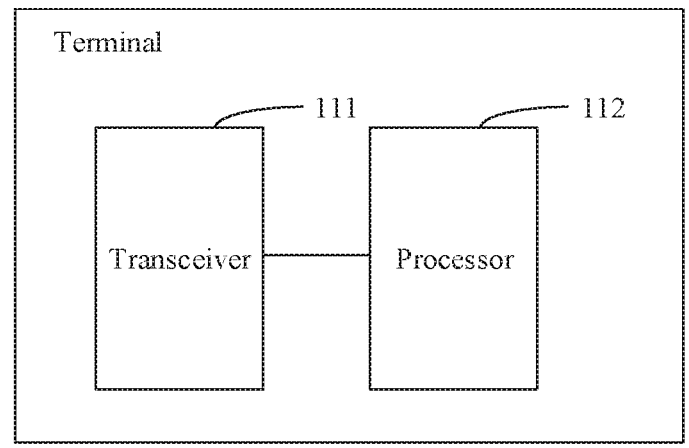
FIG. 8 is a schematic structural diagram of another terminal according to this application.

FIG. 8 is a schematic structural diagram of another terminal according to this application. As shown in FIG. 8, the terminal in this embodiment includes a transceiver 111 and a processor 112.

In hardware implementation, the receiving module 101 and the sending module 103 may be the transceiver 111 in this embodiment. Alternatively, the transceiver 111 includes a receiver and a transmitter. In this case, the receiving module 101 may be the receiver in the transceiver 111, and the sending module 103 may be the transmitter in the transceiver 111. The processing module 102 may be built in or independent of the processor 112 of the terminal in a hardware form.

The transceiver 111 may include a necessary radio frequency communications device such as a frequency mixer. The processor 112 may include at least one of a central processing unit (CPU), a digital signal processor (DSP), a microcontroller unit (MCU), an application-specific integrated circuit (ASIC), or a field programmable gate array (FPGA).

Optionally, the terminal in this embodiment may further include a memory 113. The memory 113 is configured to store a program instruction. The processor 112 is configured to invoke the program instruction in the memory 113 to perform the foregoing solutions.

The program instruction may be implemented in a form of a software function unit and can be sold or used as an independent product. The memory 113 may be a computer-readable storage medium in any form. Based on such an understanding, all or some of the technical solutions of this application may be embodied in a form of a software product, and include several instructions for enabling a computer device, which may be specifically the processor 112, to perform all or some of the steps of the terminal in the embodiments of this application. The foregoing computer-readable storage medium includes any medium that can store program code, such as a USB flash drive, a removable hard disk, a read-only memory (ROM), a random access memory (RAM), a magnetic disk, or an optical disc.

The terminal described in this embodiment may be configured to perform technical solutions performed by the terminal or the chip of the terminal in the foregoing method embodiments. Implementation principles and technical effects are similar thereof. For functions of the components of the terminal, refer to corresponding descriptions in the method embodiments, and details are not described herein again.

Figure 9:
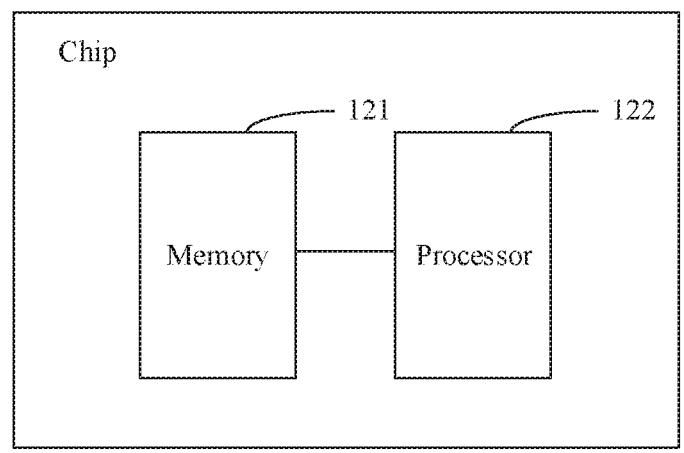
FIG. 9 is a schematic structural diagram of a chip according to this application.

FIG. 9 is a schematic structural diagram of a chip according to this application. As shown in FIG. 9, the chip in this embodiment may be used as a chip of a terminal, and the chip in this embodiment may include a memory 121 and a processor 122. The memory 121 is in communication connection with the processor 122.

In hardware implementation, the receiving module 101, the processing module 102, and the sending module 103 may be built in or independent of the processor 122 of the chip in a hardware form.

The memory 121 is configured to store a program instruction, and the processor 122 is configured to invoke the program instruction in the memory 121 to perform the foregoing solutions.

The chip described in this embodiment may be configured to perform technical solutions of the terminal or the chip inside the terminal in the foregoing method embodiments of this application. Implementation principles and technical effects are similar thereof. For functions of the modules, refer to corresponding descriptions in the method embodiments, and details are not described herein.

Figure 10:
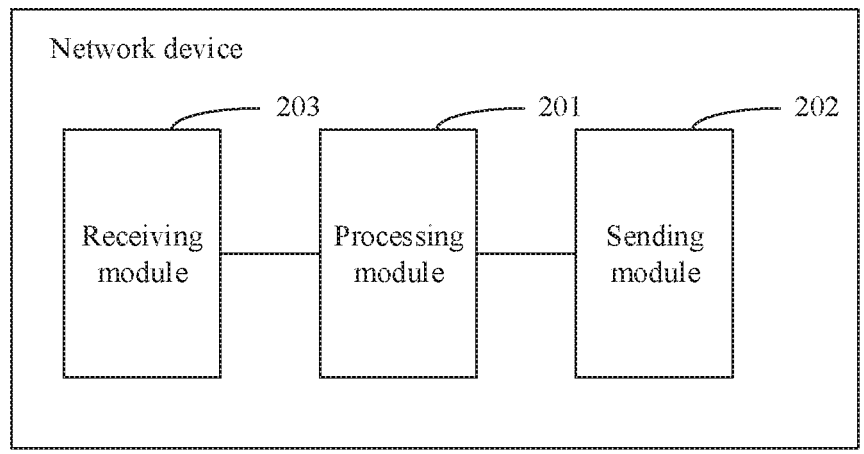
FIG. 10 is a schematic structural diagram of a network device according to this application.

FIG. 10 is a schematic structural diagram of a network device according to this application. As shown in FIG. 10, the network device in this embodiment may include a processing module 201 and a sending module 202.

The processing module 201 is configured to determine first indication information.

The sending module is configured to send the first indication information to a terminal, where the first indication information indicates the terminal to monitor at least one control resource set corresponding to at least one first bandwidth part BWP during running of a timer.

In some embodiments, the processing module 201 is configured to determine the first indication information based on a received signal strength indicator RSSI of at least one bandwidth part BWP.

In some embodiments, that the sending module 202 is configured to send a first radio resource control message, a medium access control MAC control element, or physical layer signaling to the terminal, where the first radio resource control message, the medium access control MAC control element, or the physical layer signaling includes the first indication information.

In some embodiments, the sending module 202 is further configured to send second indication information to the terminal, where the second indication information indicates the terminal to monitor at least one control resource set corresponding to at least one second BWP.

In some embodiments, the processing module 201 is further configured to determine the second indication information based on the RSSI of the at least one second BWP.

In some embodiments, that the sending module 202 is configured to send a second radio resource control message to the terminal, where the second radio resource control message includes the second indication information.

In some embodiments, the sending module 202 is further configured to send third indication information to the terminal, where the third indication information indicates the terminal to monitor at least one control resource set corresponding to at least one third BWP after the timer expires.

In some embodiments, the processing module 201 is further configured to determine the third indication information based on the RSSI of the at least one third BWP.

In some embodiments, that the sending module is configured to send a third radio resource control message, a medium access control MAC control element, or physical layer signaling to the terminal, where the first radio resource control message, the medium access control MAC control element, or the physical layer signaling includes the third indication information.

In some embodiments, the network device may further include a receiving module 203, configured to receive information or data.

The network device described in this embodiment may be configured to perform technical solutions performed by the network device or the chip of the network device in the method embodiments in FIG. 2 to FIG. 4. Implementation principles and technical effects are similar thereof. For functions of the modules, refer to corresponding descriptions in the method embodiments, and details are not described herein.

This embodiment further provides another network device. The network device may use a structure the same as that of the network device shown in FIG. 10. A sending module is configured to send measurement configuration information to a terminal, where the measurement configuration information includes a measurement reporting periodicity and at least one measurement bandwidth, and the measurement configuration information is used to indicate the terminal to measure a received signal strength RSS of the at least one measurement bandwidth based on the at least one measurement bandwidth. A receiving module is configured to receive a measurement result sent by the terminal.

In some embodiments, the measurement result includes at least one of the following: a received signal strength indicator RSSI of each measurement bandwidth, RSSIs of M measurement bandwidths, and a proportion of measurement bandwidths that meets a preset threshold condition, where M is any positive integer less than or equal to a total quantity of the at least one measurement bandwidth.

The network device described in this embodiment may be configured to perform technical solutions performed by the network device or the chip of the network device in the method embodiment in FIG. 5. Implementation principles and technical effects are similar thereof. For functions of the modules, refer to corresponding descriptions in the method embodiment, and details are not described herein.

This embodiment further provides another network device. The network device may use a same structure as that of the network device shown in FIG. 10. The sending module is configured to send timing advance indication information to a terminal, where the timing advance indication information indicates the terminal to start a timing advance timer corresponding to at least one bandwidth part BWP.

In some embodiments, the timing advance indication information does not include a BWP index, and the timing advance indication information indicates the terminal to start a timing advance timer of a current active BWP.

In some embodiments, the timing advance indication information includes at least one BWP index and the timing advance indication information indicates the terminal to start a timing advance timer of a BWP corresponding to the at least one BWP index.

The network device described in this embodiment may be configured to perform technical solutions performed by the network device or the chip of the network device in the method embodiment in FIG. 6. Implementation principles and technical effects are similar thereof. For functions of the modules, refer to corresponding descriptions in the method embodiment, and details are not described herein.

Figure 11:
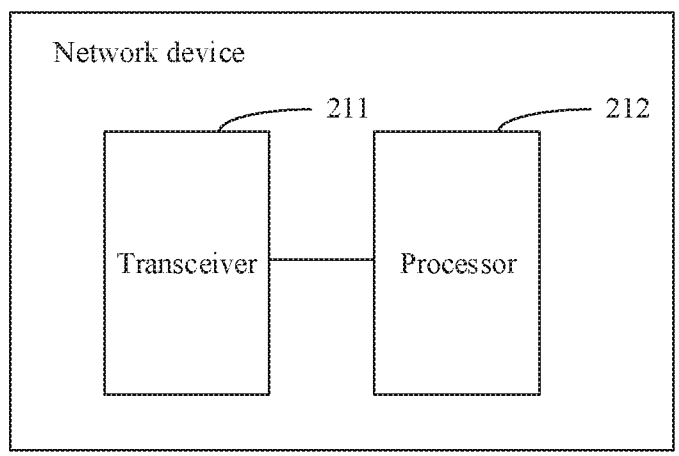
FIG. 11 is a schematic structural diagram of another network device according to this application.

FIG. 11 is a schematic structural diagram of another network device according to this application. As shown in FIG. 11, the network device in this embodiment includes a transceiver 211 and a processor 212.

In hardware implementation, the sending module 202 and the receiving module 203 may be the transceiver 211 in this embodiment. Alternatively, the transceiver 211 includes a transmitter and a receiver. The sending module 202 may be the transmitter in the transceiver 211 in this embodiment, and the receiving module 203 may be the receiver in the transceiver 211 in this embodiment.

The transceiver 211 may include a necessary radio frequency communications device such as a frequency mixer. The processor 212 may include at least one of a CPU, a DSP, an MCU, an ASIC, or an FPGA.

Optionally, the network device in this embodiment may further include a memory 213. The memory 213 is configured to store a program instruction. The transceiver 211 is configured to invoke the program instruction in the memory 213 to perform the foregoing solutions.

The network device described in this embodiment may be configured to perform technical solutions performed by the network device or the chip of the network device in the foregoing method embodiments. Implementation principles and technical effects are similar thereof. For functions of the components, refer to corresponding descriptions in the method embodiments, and details are not described herein again.

Figure 12:
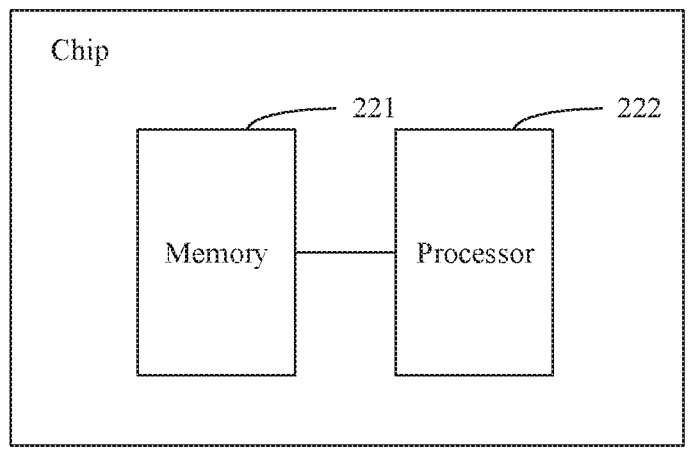
FIG. 12 is a schematic structural diagram of another chip according to this application.

FIG. 12 is a schematic structural diagram of another chip according to this application. As shown in FIG. 12, the chip in this embodiment may be used as a chip of a network device, and the chip in this embodiment may include a memory 221 and a processor 222. The memory 221 is in communication connection with the processor 222. The processor 222 may include, for example, at least one of a CPU, a DSP, an MCU, an ASIC, or an FPGA.

In hardware implementation, the sending module 202 and the receiving module 203 may be embedded in or independent of the processor 222 of the chip in a hardware form.

The memory 221 is configured to store a program instruction, and the processor 222 is configured to invoke the program instruction in the memory 221 to perform the foregoing solutions.

The program instruction may be implemented in a form of a software function unit and can be sold or used as an independent product. The memory may be a computer-readable storage medium in any form. Based on such an understanding, all or some of the technical solutions of this application may be embodied in a form of a software product, and include several instructions for enabling a computer device, which may be specifically a processor 222, to perform all or some of the steps of the network device in the embodiments of this application. The foregoing computer-readable storage medium includes: any medium that can store program code, such as a USB flash drive, a removable hard disk, a ROM, a RAM, a magnetic disk, or an optical disc.

The chip described in this embodiment may be configured to perform technical solutions of the network device or the chip inside the network device in the foregoing method embodiments of this application. Implementation principles and technical effects are similar thereof. For functions of the modules, refer to corresponding descriptions in the method embodiments, and details are not described herein.

It should be noted that, in this embodiment of this application, module division is an example, and is merely logical function division. During actual implementation, another division manner may be used. Function modules in the embodiments of this application may be integrated into one processing module, or each of the modules may exist alone physically, or two or more modules are integrated into one module. The integrated module may be implemented in a form of hardware, or may be implemented in a form of a software function module.

When the integrated module is implemented in the form of a software function module and sold or used as an independent product, the integrated module may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A wireless communication method, comprising:
receiving, by a terminal, first indication information sent by a network device, wherein the first indication information indicates the terminal to monitor at least one control resource set corresponding to at least one first bandwidth part (BWP) during running of a timer;
receiving, by the terminal, second indication information sent by the network device, wherein the second indication information indicates the terminal to monitor at least one control resource set corresponding to at least one second BWP when the timer does not run;
monitoring, by the terminal, based on the received second indication information, the at least one control resource set corresponding to at least one second BWP;
in response to receiving downlink control information on the at least one control resource set corresponding to the at least one second BWP, starting the timer by the terminal;
monitoring, by the terminal, based on the received first indication information, the at least one control resource set corresponding to at least one first BWP; and
restarting, by the terminal, the timer after receiving downlink control information on the at least one control resource set corresponding to the at least one first BWP during running of the timer.

2. The method according to claim 1, wherein the receiving, by the terminal, second indication information sent by the network device comprises:
receiving, by the terminal, a radio resource control message sent by the network device, wherein the radio resource control message comprises the second indication information.

3. The method according to claim 1, wherein the method further comprises:
receiving, by the terminal, third indication information sent by the network device, wherein the third indication information indicates the terminal to monitor at least one control resource set corresponding to at least one third BWP after the timer expires.

4. The method according to claim 3, wherein the method further comprises:
starting or restarting, by the terminal, the timer after the terminal receives downlink control information on the at least one control resource set corresponding to the at least one third BWP.

5. The method according to claim 3, wherein the first indication information, the second indication information, or the third indication information comprises bitmap information of N bits, wherein
N is a total quantity of BWPs configured by the network device, and one bit is used to indicate one BWP.

6. The method according to claim 3, wherein the first indication information and the third indication information are carried in a radio resource control message, a medium access control MAC control element, or physical layer signaling.

7. A wireless communication method, comprising:
determining, by a network device, first indication information;
sending, by the network device, the first indication information to a terminal, wherein the first indication information indicates the terminal to monitor at least one control resource set corresponding to at least one first bandwidth part (BWP) during running of a timer;
sending, by the network device, second indication information to the terminal, wherein the second indication information indicates the terminal to monitor at least one control resource set corresponding to at least one second BWP when the timer does not run; and
in response to receiving downlink control information on the at least one control resource set corresponding to the at least one second BWP, starting the timer by the terminal.

8. The method according to claim 7, wherein the determining, by a network device, first indication information comprises:
determining, by the network device, the first indication information based on a received signal strength indicator (RSSI) of the at least one first bandwidth part BWP.

9. The method according to claim 7, wherein the sending, by the network device, the first indication information to a terminal comprises:
sending, by the network device, a first radio resource control message, a medium access control (MAC) control element, or physical layer signaling to the terminal, wherein
the first radio resource control message, the medium access control MAC control element, or the physical layer signaling comprises the first indication information.

10. The method according to claim 9, wherein the sending, by the network device, second indication information to the terminal comprises:
sending, by the network device, a second radio resource control message to the terminal, wherein the second radio resource control message comprises the second indication information.

11. The method according to claim 7, wherein the method further comprises:
determining, by the network device, the second indication information based on a received signal strength (RSSI) of the at least one second BWP.

12. The method according to claim 7, wherein the method further comprises:
sending, by the network device, third indication information to the terminal, wherein the third indication information indicates the terminal to monitor at least one control resource set corresponding to at least one third BWP.

13. The method according to claim 12, wherein the method further comprises:
determining, by the network device, the third indication information based on a received signal strength (RSSI) of the at least one third BWP.

14. The method according to claim 13, wherein the sending, by the network device, third indication information to the terminal comprises:
sending, by the network device, a third radio resource control message, a medium access control (MAC) control element, or physical layer signaling to the terminal, wherein the third radio resource control message, the medium access control MAC control element, or the physical layer signaling comprises the third indication information.

* * * * *